J. H. RIGGS.
Whiffletree.

No. 113,568.

Patented Apr. 11, 1871.

Witnesses.
Edw. Griffith
W. A. Saunders.

Joseph H. Riggs,
by his Attorney,
Frederick Curtis.

United States Patent Office.

JOSEPH H. RIGGS, OF CHELSEA, MASSACHUSETTS.

Letters Patent No. 113,568, dated April 11, 1871.

IMPROVEMENT IN WHIFFLETREES.

The Schedule referred to in these Letters Patent and making part of the same.

*To all whom it may concern:*

Be it known that I, JOSEPH H. RIGGS, of Chelsea, in the county of Suffolk and Commonwealth of Massachusetts, have made an invention of certain novel and useful Improvements in the Attachments of Whiffletrees to Vehicles; and do hereby declare the following description to embrace the nature, purposes, and advantages of such invention, and the manner in which it is or may be carried into effect, due reference being had to the accompanying drawing making part of this specification, and wherein—

Figure 1:
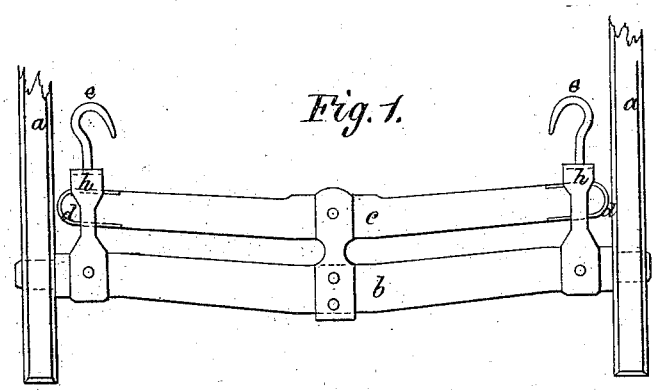
Figure 2:
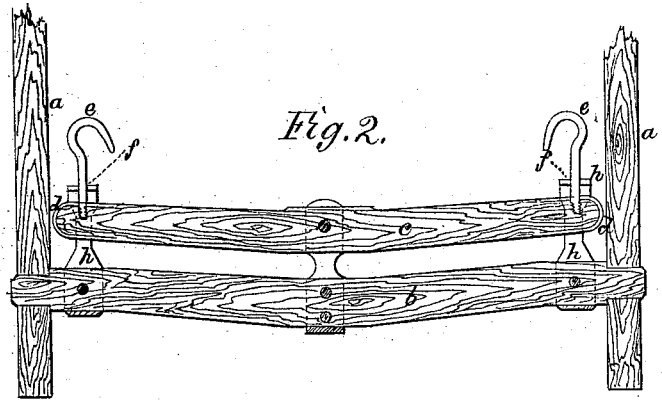

Figure 1 is a plan;

Figure 2, a longitudinal section; and

Figure 3:

Figure 3, a vertical section of my improvements.

This invention relates to improvements in, or a peculiar mode of attaching and providing an ordinary wooden whiffletree, whereby, upon fracture of the same, the traces of the animal's harness are still securely confined to the vehicle and no accident occurs, the purpose of the invention being to avoid, in a simple and inexpensive manner the many accidents now resulting from the breakage of the whiffletrees of wheeled vehicles.

This invention consists in the employment of two yokes or clasps, projected from the cross-bar of the shafts, and so as to surround each end of the whiffletree; and in combination with such clasps, in the adoption of a hook, attached to each end of said whiffletree, the shank of which passes through a slot in each clasp, in manner as hereinafter stated, whereby, upon fracture of the whiffletree, the said hooks retain a hold upon the adjacent clasp and confine the traces thereto.

The accompanying drawing represents at *a a* the shafts of an ordinary land-carriage or wheeled vehicle, the cross-bar of such shafts being shown at *b*, and the whiffletree at *c*, the latter being pivoted to the cross-bar in the usual manner, at the center of each.

In carrying my improvement into practice I secure to each end of the cross-bar *b* a metallic clasp or yoke, *h*, which extends outwardly and so as to embrace the adjacent end of the whiffletree, the two clasps being of sufficient length to permit of the necessary oscillations of the latter.

For purposes of strength and safety each end of the whiffletree is protected by a metallic band, *d*, which passes about it, while extending outwardly from each of such ends is a hook, *e*, the shank of which passes through an orifice, *f*, made in the outer end of each clasp, such orifice being of a length transversely sufficient to permit of the vibrations of the hook therein.

It will be apparent that, should the whiffletree break, no accident would occur, as the draft of the carriage would be exerted upon the cross-bar through the intervention of the clasps *h h*.

The adoption of my present improvement would necessitate no change in the ordinary construction of a vehicle beyond the addition of the clasps *h h* and the hooks *e e*, or their substitutes; hence but a trifling expense is entailed, and no cumbersome or unsightly appendage is necessary.

*Claim.*

I claim—

In combination with the cross-bar, shafts, and whiffletree of an ordinary wheeled vehicle, the clasps or yokes *h h* and the hooks *e e*, or their substitutes, the whole operating as hereinbefore explained.

JOSEPH H. RIGGS.

Witnesses:
FRED. CURTIS,
EDW. GRIFFITH.